Figure 1:
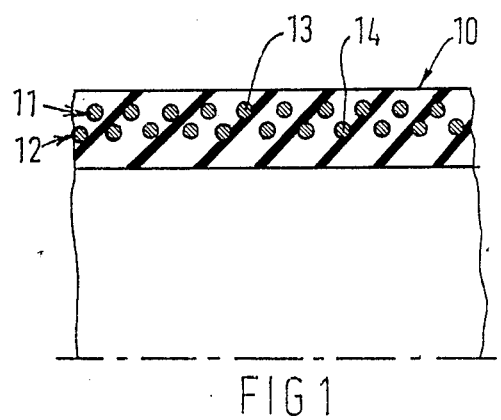

United States Patent [19]

Griffiths et al.

[11] Patent Number: 4,773,151

[45] Date of Patent: Sep. 27, 1988

[54] METHOD OF MAKING A HOSE

[75] Inventors: Alan D. Griffiths, Binbrook; Peter T. Hale, Sutton Coldfield, both of England

[73] Assignee: Dunlop Limited, United Kingdom

[21] Appl. No.: 82,958

[22] Filed: Aug. 6, 1987

Related U.S. Application Data

[63] Continuation of Ser. No. 924,139, Oct. 27, 1986, abandoned, which is a continuation of Ser. No. 680,473, Dec. 11, 1984, abandoned.

[30] Foreign Application Priority Data

Aug. 21, 1984 [GB] United Kingdom ............... 8421237

[51] Int. Cl.$^4$ ............................................. B23P 17/00
[52] U.S. Cl. ................................ 29/527.2; 29/728; 29/825; 174/47
[58] Field of Search ............ 29/527.2, 516, 728, 29/825; 174/47; 427/383.7, 383.9

[56] References Cited

U.S. PATENT DOCUMENTS

| 23,103 | 3/1859 | Mattson | 524/431 X |
|---|---|---|---|
| 417,796 | 12/1889 | Taft | 138/127 |
| 682,913 | 9/1901 | Coleman | 428/907 X |
| 1,017,271 | 2/1912 | Subers | 138/130 X |
| 1,651,022 | 11/1927 | Fulton | 138/127 X |
| 1,692,255 | 11/1928 | Fulton | 138/127 X |
| 2,151,307 | 3/1939 | Smith | 138/133 |
| 2,438,146 | 3/1948 | Candee et al. | 138/127 X |
| 2,448,609 | 9/1948 | Malm | 524/431 X |
| 3,070,132 | 12/1962 | Sheridan | 138/103 |
| 3,118,223 | 1/1964 | Schull et al. | 72/47 |
| 3,137,670 | 6/1964 | Maneri | 524/431 X |
| 3,167,126 | 1/1965 | Reineke, Jr. et al. | 138/133 X |
| 3,219,505 | 11/1965 | Hilding | 428/907 X |
| 3,459,233 | 8/1969 | Webbe | 138/131 |
| 3,476,577 | 11/1969 | Davie | 428/907 X |
| 3,555,170 | 1/1971 | Petzetakis | 138/103 X |
| 3,711,570 | 11/1973 | Coleman | 138/131 |
| 3,908,068 | 9/1973 | MacKenzie, Jr. | 428/389 |
| 4,225,352 | 9/1980 | Makino et al. | 524/431 X |
| 4,230,899 | 10/1980 | Kanao | 174/47 |
| 4,377,650 | 3/1983 | Fischer | 524/431 X |
| 4,402,346 | 9/1983 | Cheetham et al. | 138/133 X |
| 4,428,989 | 1/1984 | Marshall | 428/907 X |
| 4,518,034 | 5/1985 | Vokey | 29/825 X |
| 4,603,653 | 8/1986 | Bews | 116/209 |

FOREIGN PATENT DOCUMENTS

| 43-18273 | 2/1968 | Japan | 29/516 |
|---|---|---|---|
| 883092 | 1/1980 | U.S.S.R. | |
| 373302 | 3/1931 | United Kingdom . | |
| 862660 | 3/1961 | United Kingdom | 174/47 |
| 1209474 | 10/1966 | United Kingdom . | |
| 1235973 | 6/1971 | United Kingdom . | |
| 1353760 | 6/1971 | United Kingdom . | |
| 1457524 | 12/1973 | United Kingdom . | |
| 1408347 | 10/1975 | United Kingdom . | |
| 1423059 | 1/1976 | United Kingdom . | |
| 1429104 | 3/1976 | United Kingdom . | |
| 1511630 | 5/1978 | United Kingdom . | |
| 1516647 | 7/1978 | United Kingdom . | |
| 2002084 | 2/1979 | United Kingdom . | |
| 2105434A | 3/1983 | United Kingdom . | |

Primary Examiner—P. W. Echols
Assistant Examiner—Carl J. Arbes
Attorney, Agent, or Firm—Stevens, Davis, Miller & Mosher

[57] ABSTRACT

A flexible hose suitable for the transportation of biphasic fluids such as crude oil containing hydrogen sulphide is reinforced by steel wires of a kind having a coating of aluminium formed by applying the aluminium to the steel under a high pressure so as to bring the two metals into intimate contact.

Preferably the wires are subject to a drawing operation subsequent to cladding.

12 Claims, 1 Drawing Sheet

METHOD OF MAKING A HOSE

This application is a continuation of application Ser. No. 924,139, filed Oct. 27, 1986 now abandoned which is a continuation of Ser. No. 680,473 filed Dec. 11, 1984 and now abandoned.

This invention relates to hose and in particular, though not exclusively, to flexible hose for the transportation of corrosive fluid under a high pressure.

Flexible high pressure hose is useful for the transportation of biphasic corrosive fluid such as crude oil containing hydrogen sulphide. Particularly due to the pressure differential across the wall of the hose the hydrogen sulphide is caused to penetrate through the polymeric material of the hose wall and will readily corrode the high tensile steel reinforcement commonly provided in the hose wall for the purpose of containing those forces due to the pressure of the oil.

Various proposals have been put forward for the purpose of reducing the rate of corrosion of the steel reinforcement. For example it has been proposed to provide in the hose wall paths of relatively low permeability preferentially to direct permeating hydrogen sulphide through the hose wall so as to reduce the extent to which it migrates towards and into contact with the steel reinforcement. It has been proposed also to provide around the steel wires, cables or cords used to form the reinforcement a protective sheath which affords electro-chemical protection to the steel by acting in effect as a sacrificial coating.

Whilst these proposals result in some degree of corrosion protection they cannot be relied upon to provide the desired degree of protection necessary to ensure a long working life for hose used under many adverse conditions. Furthermore, the requirement to provide a relatively low permeability path between successive turns of a conventional helically wound steel wire reinforcement or a thick protective sheath for the wire reinforcement restricts the reinforcement strength attainable within a given radial thickness; extra strength could be obtained by an increase in the thickness of the reinforcement structure but hose flexibility and overall size would then be affected adversely.

For the purpose of providing improved corrosion resistance to the steel reinforcement of a high pressure flexible hose the present invention provides that the reinforcement structure shall comprise steel wires of a kind having a coating of aluminium formed by applying the aluminium to the steel under a high pressure such that the steel and aluminium are in intimate contact one with another.

Preferably the aluminium coated wires are formed by an extrusion process wherein the aluminium is applied around a steel core under a pressure of extrusion greater than 1 MPa, more preferably in the range 10 to 350 MPa. The pressure of extrusion referred to herein is the pressure exerted by the extruded aluminium on the steel core wire during the extrusion process. This pressure results in a pressure welding of the aluminium to the steel.

Alternatively the reinforcement may be provided by aluminium coated wires of a kind wherein aluminium is applied, at a pressure optionally lower than those above-referred, around a steel core wire of a greater diameter than required for the construction of the hose. The coated steel wire is subjected to a drawing operation which reduces the overall diameter of the wire to the required size as well as resulting in a sufficient pressure, i.e. a pressure as above-referred, to cause a bond to form between the steel core and the aluminium coating.

Preferably the coating of aluminium has a radial thickness in the range of 0.01 to 0.6 mm, more preferably in the range 0.04 to 0.10 mm, in order to provide an adequate degree of corrosion protection without unduly increasing the thickness of the reinforcement layer in a case of the use of steel wires having an outer diameter in the range 0.5 to 6.0 mm.

Figure 2:
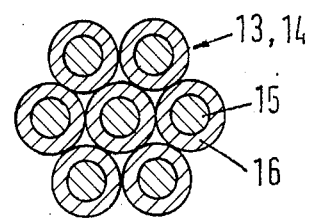

One embodiment of the invention will now be described, by way of example, with reference to the accompanying diagrammatic drawings wherein:

FIG. 1 is a longitudinal cross-sectional view of part of a hose in accordance with the present invention, and FIG. 2 is a cross-sectional view of one of the reinforcement cords of the hose of FIG. 1.

A hose in accordance with the present invention comprises a body of elastomeric material 10 having embedded therein two layers of wire reinforcement 11,12.

Each reinforcement layer comprises approximately twenty cords each of an assembly of seven wire filaments (six wires being twisted around a central core wire), said cords being arranged to extend helically relative to the direction of the length of the hose. The cords 13 forming the radially outer reinforcement layer extend with a right-hand twist relative to the direction of the length of the hose whilst the cords 14 forming the radially inner reinforcement layer 12 extend in the hose body 10 with a left-hand twist.

The reinforcement cords 13,14 all are of a kind comprising seven wire filaments of identical diameter, and each wire filament has a steel core 15 1.4 mm diameter surrounded by a coating 16 of aluminium having a thickness of 0.22 mm. The coated wires are formed by cold extruding aluminium around the steel wire under a high pressure so that during the extrusion process the aluminium is forced into contact with the steel at a maximum pressure during the extrusion process of no less than 20 MPa.

The improved corrosion resistance of the steel reinforcement of the hose as a result of using steel wires of a kind having an aluminium coating that has been applied under a high pressure is demonstrated by the test results set forth in the following table.

In the tests samples of wires were stressed statically to 30% of their original breaking load, and whilst so stressed a length of the wire was extended vertically through a glass tube sealed in fluid-tight manner to the wire at the ends of the tube such that said length of wire could be maintained immersed in a solution of 3.5 g of sodium chloride dissolved in 96.5 cc of distilled water.

A heater was provided so that tests could be undertaken at ambient temperature (20°±5° C.) or at 60° C. Additionally means was provided to circulate continuously carbon dioxide and hydrogen sulphide through the brine solution which thereby was maintained saturated with said gases.

|  | Time to Failure (hours) | |
| --- | --- | --- |
|  | At 20° C. | At 60° C. |
| Brass-plated steel wire (2 samples) | 13, 37 | 2.5, 8 |
| Galvanised steel wire (4 samples) | 682, 971, 251, 309 | 272, 1048, 914, 348 |
| Aluminum coated steel wire | >2000 >2000 | >2000 >2000 |

|  | Time to Failure (hours) | |
| --- | --- | --- |
|  | At 20° C. | At 60° C. |
| (2 samples) | | |

Each sample was exposed to the brine solution until it broke or 2,000 hours had elapsed, it having been considered that any wire able to withstand the test environment for that period of time would give satisfactory performance when used in a hose. From the above table it will be seen that only the aluminium coated steel wire appeared to be satisfactory.

We claim:

1. A method of making a flexible high pressure hose for transportation of bi-phasic corrosive fluid under high pressure, said method comprising:

applying a coating of aluminium to steel wires under a pressure greater than 1 MPa such that the steel wires and aluminium are in intimate contact with each other;

forming said steel wires into a reinforcement structure; and imbedding said reinforcement structure into a body of elastomeric material.

2. The method as in claim 1, wherein the aluminium is applied to the steel wires by an extrusion process.

3. The method as in claim 1, wherein the aluminium is applied to the steel wires under a pressure in the range 10–350 MPa.

4. The method as in claim 1, wherein the aluminium is applied to the steel wires under a pressure greater than 20 MPa.

5. The method as in claim 1, wherein after the steel wires have been coated with aluminium, the aluminium-coated wires are subjected to a drawing process to reduce the diameter of the aluminium-coated wires.

6. The method as in claim 1, wherein the aluminium is coated on said steel wires to a thickness in the range 0.01–0.6 mm.

7. The method as in claim 1, wherein the aluminium is coated on the steel wires to a thickness in the range of 0.04–0.10 mm.

8. The method as in claim 1, wherein each of the steel wires prior to said alumimium being coated thereon has a diameter in the range 0.5–6.0 mm.

9. The method as in claim 1, wherein a plurality of said aluminium-coated steel wires are employed to form a plurality of cords, said plurality of cords being used to form said reinforcement structure.

10. The method as in claim 5, wherein said aluminium-coated wires have the coating of aluminium applied against the steel wires under said pressure greater than 1 MPa during said drawing process.

11. The method as in claim 1, wherein said steel wires are of high tensile.

12. The method as in claim 11, wherein the the coating of aluminium is applied to the steel wires under pressure of greater than 1 MPa during said drawing process.

* * * * *